(12) United States Patent
Fencl et al.

(10) Patent No.: US 12,529,030 B2
(45) Date of Patent: Jan. 20, 2026

(54) FREQUENCY CONTROLLED MECHANICAL ACTUATOR WITH MICROFLUIDIC FLOW FOR GENERATION OF 3D MICROGEL FOR CELL CULTURING

(71) Applicant: UNM Rainforest Innovations, Albuquerque, NM (US)

(72) Inventors: Frank Anthony Fencl, Albuquerque, NM (US); Nick Carroll, Albuquerque, NM (US); Gabriel P. Lopez, Santa Fe, NM (US); Jacqueline De Lora, Albuquerque, NM (US); Andrew P Shreve, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 962 days.

(21) Appl. No.: 17/286,603

(22) PCT Filed: Oct. 21, 2019

(86) PCT No.: PCT/US2019/057243
§ 371 (c)(1),
(2) Date: Apr. 19, 2021

(87) PCT Pub. No.: WO2020/082075
PCT Pub. Date: Apr. 23, 2020

(65) Prior Publication Data
US 2022/0112456 A1 Apr. 14, 2022

Related U.S. Application Data

(60) Provisional application No. 62/747,721, filed on Oct. 19, 2018.

(51) Int. Cl.
*B33Y 10/00* (2015.01)
*B33Y 70/00* (2020.01)
*B33Y 80/00* (2015.01)
*C12N 5/00* (2006.01)
*C12N 13/00* (2006.01)

(52) U.S. Cl.
CPC ............ *C12N 5/0062* (2013.01); *B33Y 10/00* (2014.12); *B33Y 70/00* (2014.12); *B33Y 80/00* (2014.12); *C12N 5/0012* (2013.01); *C12N 13/00* (2013.01)

(58) Field of Classification Search
None
See application file for complete search history.

(56) References Cited

PUBLICATIONS

Jacqueline A. De Lora (De Lora, Jacqueline A "Developing Droplet Based 3D Cell Culture Methods to Enable Investigations of the Chemical Tumor Microenvironment." (2018). https://digitalrepository.unm.edu/biom_etds/186, Jul. 10, 2018) (Year: 2018).*
Liu et al (Biomed Microdevices (2017) 19: 55, DOI 10.1007/s10544-017-0198-8). (Year: 2017).*
He et al (Scientific Reports | 6:29977 | DOI: 10.1038/srep29977, Published: Jul. 20, 2016). (Year: 2016).*
Ziemecka et al (Lab Chip, 2011, 11, 620-624, DOI: 10.1039/c0lc00375a) (Year: 2011).*
Leibacher et al (Lab Chip, 2015, 15, 2896, DOI: 10.1039/c5lc00083a). (Year: 2015).*
Kim et al (J Chem Technol Biotechnol 2017; 92: 201-209, DOI: 10.1002/jctb.4991). (Year: 2017).*
Simon (Dissertation, The University of Michigan, 2013, https://hdl.handle.net/2027.42/99822). (Year: 2013).*
Leung et al (Chapter 9—Bioprinting Using Aqueous Two-Phase System, 2015, Editor(s): Anthony Atala, James J. Yoo, Essentials of 3D Biofabrication and Translation, doi: 10.1016/B978-0-12-800972-7.00009-8.). (Year: 2015).*
"International Application Serial No. PCT/US2019/057243, International Preliminary Report on Patentability mailed Apr. 29, 2021", 7 pgs.
"International Application Serial No. PCT/US2019/057243, International Search Report mailed Jan. 30, 2020", 3 pgs.
"International Application Serial No. PCT/US2019/057243, Invitation to Pay Additional Fees mailed Dec. 18, 2019", 2 pgs.
"International Application Serial No. PCT/US2019/057243, Written Opinion mailed Jan. 30, 2020", 5 pgs.
Devi, M. G., et al., "A Review of Three-dimensional Printing for Biomedical and Tissue Engineering Applications", The Open Biotechnology Journal. 12, (Sep. 7, 2018), 15 pgs.
Franke, Thomas, et al., "Surface acoustic wave (SAW) directed droplet flow in microfluidics for PDMS devices", Lab on a Chip. 9(18), 2625-2627.
Mastiani, Mohammad, et al., "High-Throughput Aqueous Two-Phase System Droplet Generation by Oil-Free Passive Microfluidics", Department of Ocean and Mechanical Engineering, Florida Atlantic University, Boca Raton, Florida 33431, United States, (Aug. 16, 2018), 9296-9302.
Utech, Stefanie, et al., "Microfluidic Generation of Monodisperse, Structurally Homogeneous Alginate Microgels for Cell Encapsulation and 3D Cell Culture", Advanced Healthcare Materials; 4(11), (Aug. 5, 2015), 1628-1633.

* cited by examiner

*Primary Examiner* — Peter Paras, Jr.
*Assistant Examiner* — Khoa Nhat Tran
(74) *Attorney, Agent, or Firm* — Schwegman, Lundberg & Woessner, P.A.

(57) ABSTRACT

Methods and apparatus for acoustically assisted droplet generation with or without cell encapsulation.

21 Claims, 8 Drawing Sheets

FREQUENCY CONTROLLED MECHANICAL ACTUATOR WITH MICROFLUIDIC FLOW FOR GENERATION OF 3D MICROGEL FOR CELL CULTURING

CROSS-REFERENCE TO RELATED APPLICATIONS

The following application claims benefit of U.S. Provisional Application No. 62/747,721, filed Oct. 19, 2018, which is hereby incorporated by reference in its entirety.

STATEMENT OF GOVERNMENT SUPPORT

This invention was made with government support under grant number DE-SC0001035 awarded by the Department of Energy, and grant number CA 189682 awarded by the National Institutes of Health. The government has certain rights in the invention.

BACKGROUND

Alginate matrices have been shown to be a robust and exceptional environment for 3D culture of mammalian cells' which is important in the development of therapeutics for cancer as well as in the fabrication of synthetic tissue via bioprinting.[2,3] Alginate matrices provide a model biocompatible matrix for cell culture because their composition can be engineered to imitate that of natural polymers which promote cell adhesion and proliferation.[4] Alginate matrices have been integrated into droplet microfluidics and have been shown to create droplets for 3D cell culturing.[5] Methods of synthesizing aqueous droplets via microfluidics are useful but limited in that the drops are stabilized using oil-water emulsion solutions.[6-8] This combination of immiscible fluids is not ideal for cell culturing because water soluble nutrients and drug compounds are unable to diffuse through the oil phase into the aqueous droplets where the cells reside. Additionally, biomolecules such as protein may be disrupted by denaturation upon exposure to the oil phase.[9] Therefore, introducing alternative droplet fluidic methods to create uniform droplet hydrogels for biocompatible 3D cell culturing applications is necessary.

SUMMARY

In general, the present disclosure provides methods and apparatus for acoustically assisted droplet generation. The methods and apparatus utilize water-in-water systems and the resulting droplets may be used, for example, to produce cell culturing microgels.

According to a more specific embodiment, the present disclosure provides a new method of synthesizing size-controlled dextran-alginate droplets via acoustic modulation integration with microfluidics. According to a still further embodiment, the present disclosure provides a microcapillary-based, acoustically assisted, microfluidic system for differential aqueous phase infusion and coupling of one or more entrapped cells in a pre-gel phase. According to yet another embodiment, the method and/or apparatus may be used in 3D cell culturing applications. According to still another embodiment, the method and/or apparatus may be used in 3D bioprinting applications. According to yet another embodiment, the method can be used for phase separation for component biologicals such as drugs or biological molecules like complex sugars, nucleic acids, proteins, amino acids etc.

DETAILED DESCRIPTION

In general, the present disclosure provides methods and apparatus for acoustically assisted droplet generation. The methods and apparatus utilize water-in-water systems and the resulting droplets may be used, for example, to produce cell culturing microgels.

According to a more specific embodiment, the present disclosure provides a new method of synthesizing size-controlled dextran-alginate droplets via acoustic modulation integration with microfluidics. According to a still further embodiment, the present disclosure provides a microcapillary-based, acoustically assisted, microfluidic system for differential aqueous phase infusion and coupling of one or more entrapped cells in a pre-gel phase. According to yet another embodiment, the method and/or apparatus may be used in 3D cell culturing applications. According to still another embodiment, the method and/or apparatus may be used in 3D bioprinting applications. According to yet another embodiment, the method can be used for phase separation for component biologicals such as drugs or biological molecules like complex sugars, nucleic acids, proteins, amino acids etc.

Figure 1:
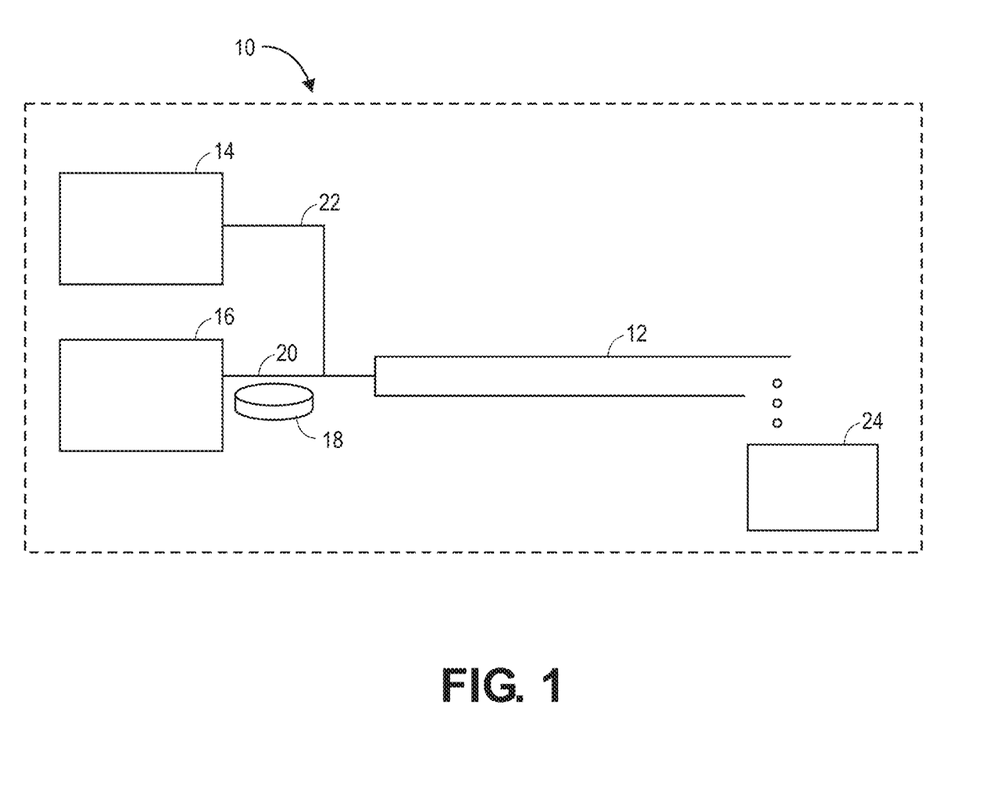
FIG. 1 is a schematic illustration of an exemplary embodiment of the system for producing the 3D microgels of the present disclosure.

FIG. 1 is a schematic illustration of an exemplary embodiment of the system of the present disclosure. It will be understood that the system shown in FIG. 1 could take the form of a low-cost system using components that are readily available in a laboratory setting (as described in greater detail in the Examples section below), or could be a wholly integrated device comprising components that are designed specifically for their intended purpose in the system. In general, the system 10 includes a microfluidic channel (or device) 12, which is fluidly connected to first and second fluid reservoirs 14 and 16, respectively. An acoustic wave generator 18 is positioned between the second fluid reservoir 16 and microfluidic device 12. Reservoir 24 collects droplets produced in the microfluidic device.

According to an embodiment, the first and second fluid reservoirs may contain aqueous polymer solutions which, when combined under suitable conditions, such as using the system described herein, form three-dimensional (3D) hydrogels having an inner phase and an outer phase.

Accordingly, in practice, first reservoir 14 may contain the outer phase fluid while second reservoir 16 may contain the inner phase fluid. The inner phase fluid from reservoir 16 flows through fluid line 20 and encounters acoustic waves produced by acoustic wave generator 18. The acoustic wave generator oscillates across a small frequency range to modulate droplet formation. The inner phase fluid droplets then encounter the outer phase fluid flowing through fluid line 22 and enter microfluidic channel (or device) 12. The resulting droplets are then collected in reservoir 24, which may contain a suitable media, including, for example CaC12 or any other suitable crosslinking agent.

Fluid reservoirs 14 and 16 may take the form of or include syringe pumps or other automated or hand operated mechanisms for controlling fluid flow from the reservoirs.

Acoustic wave generator 18 may take the form of a standard household speaker or other suitable device. While the presently described embodiments primarily utilize an acoustic wave generator to modulate the droplet formation of the inner phase solution, it will be understood that other suitable mechanisms could be employed and are contemplated by the present disclosure. Other suitable well-known mechanisms/devices for modulating droplet formation include, but are not limited to, sonicators, vibrating rods, piezoelectric systems, and the like.

It should be noted that while the present disclosure and accompanying drawings disclose two reservoirs designed to produce two phases, the presently described techniques can also be used to produce more than two phases.

According to an embodiment aqueous polymer solutions are dextran (DEX) and polyethylene glycol (PEG). According to a more specific embodiment the inner phase fluid is a DEX aqueous solution and the outer phase fluid is a PEG aqueous solution.

When dissolved in water, certain multicomponent polymer solutions exhibit phase separation related to thermal equilibrium and polymer properties that include density.[10-13] Of these polymers, dextran (DEX) and polyethylene glycol (PEG) exhibit phase separation at specific mass percent concentrations. This phase separation of DEX and PEG enables the creation of immiscible droplets of either phase after the solution is physically mixed. Previous work has shown that incorporating these fluids in a microfluidic device can form droplets after a secondary physical force is applied to break up the fluidic jet.[9,14] This secondary force overcomes the low interfacial tension of the two aqueous phases, enhancing droplet breakup in a co-flowing system. The present disclosure provides a novel system that uses an acoustic force to break-up an aqueous two-phase fluidic system into monodispersed droplets for 3D hydrogel formation and cell culture.

Figure 2:
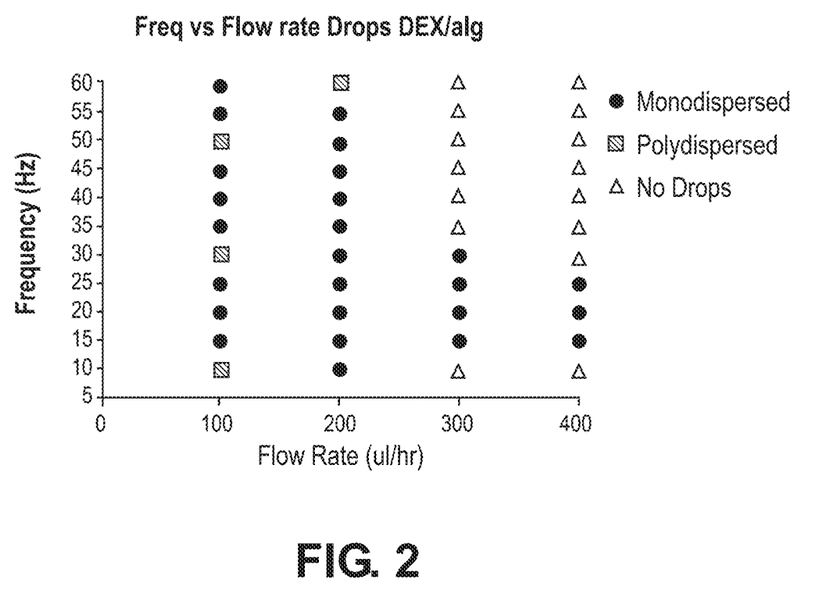
FIG. 2 is a graph showing frequency vs flow of droplets without cells.
Figure 3:
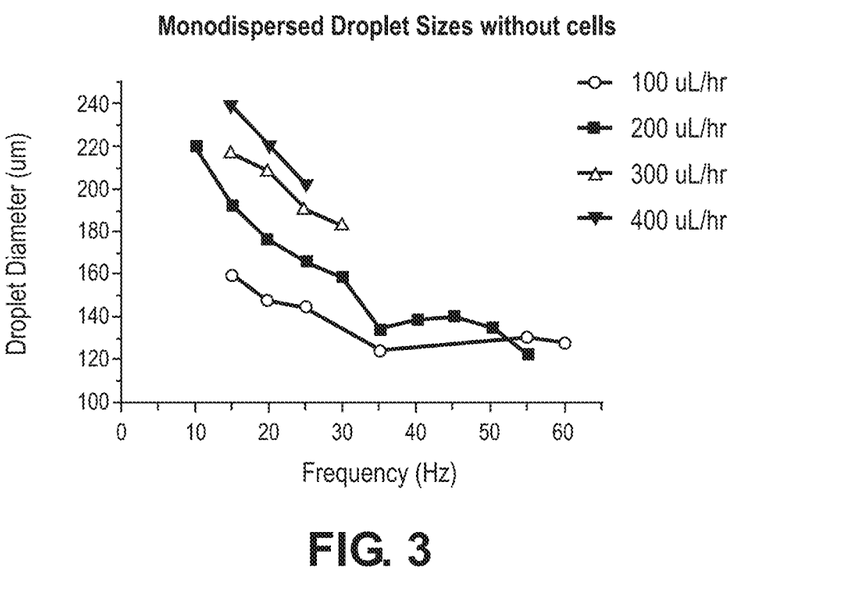
FIG. 3 is graph showing the monodisperse size of droplets without cells.
Figure 4:
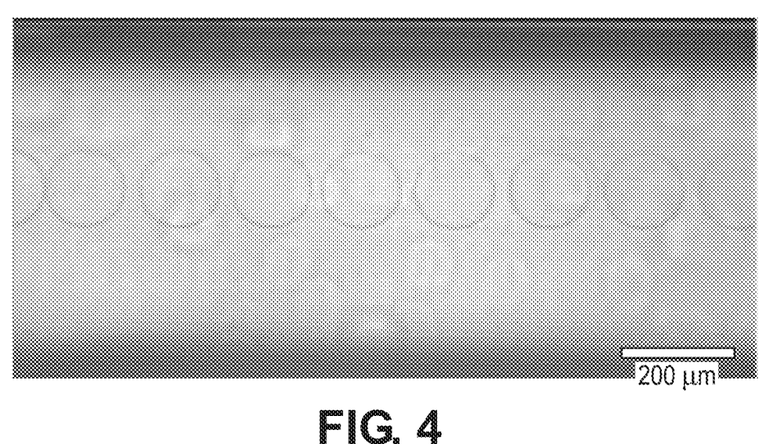
FIG. 4 is an image of monodisperse droplets without cells.
Figure 5:
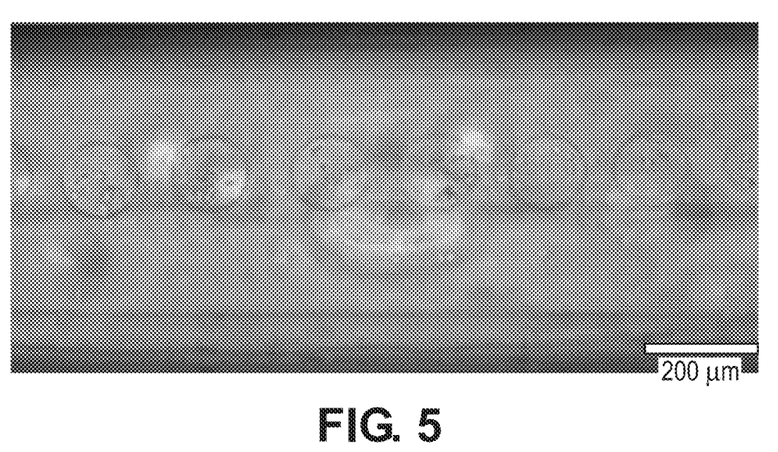
FIG. 5 is an image of monodisperse droplets with cells.
Figure 6:
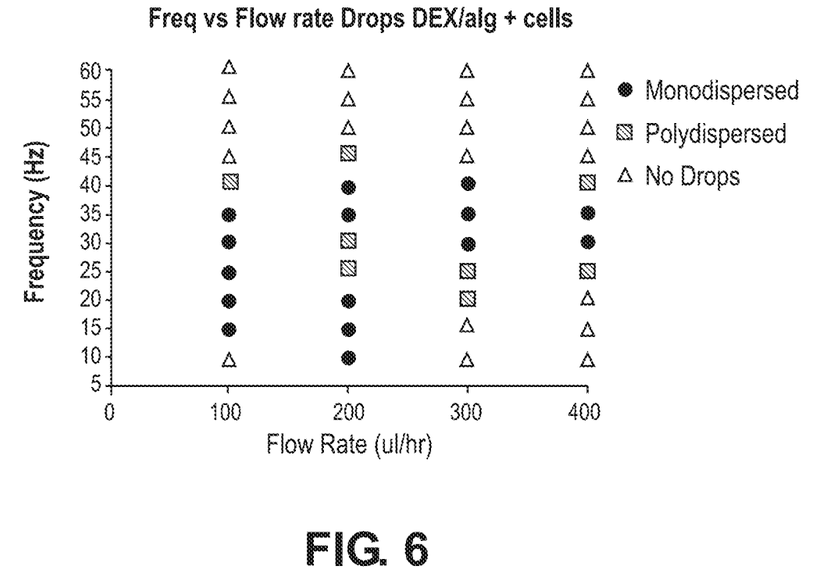
FIG. 6 is a graph showing frequency vs flow of droplets with cells.
Figure 7:
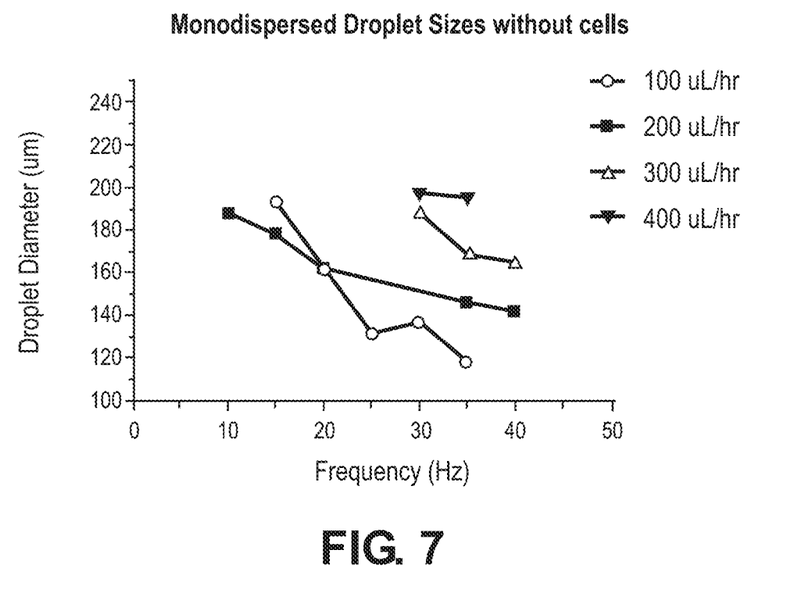
FIG. 7 is graph showing the monosdisperse size of droplets with cells.
Figure 8:
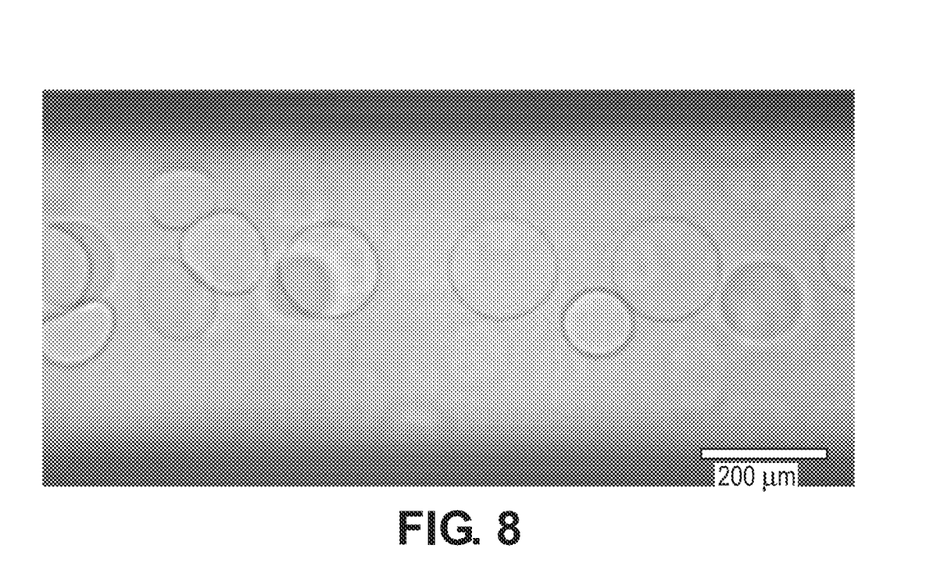
FIG. 8 is an image of polydisperse droplets without cells.
Figure 9:
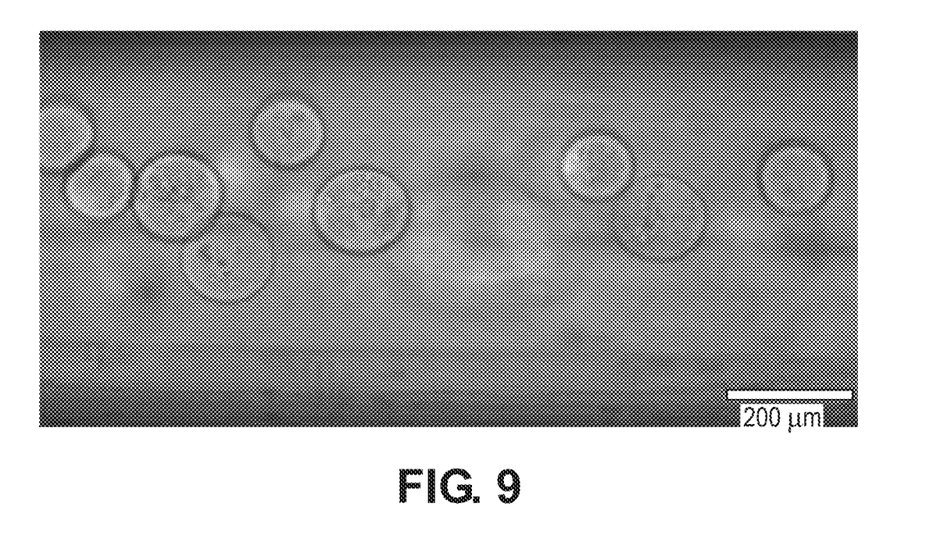
FIG. 9 is an image of polydisperse droplets with cells.
Figure 10:
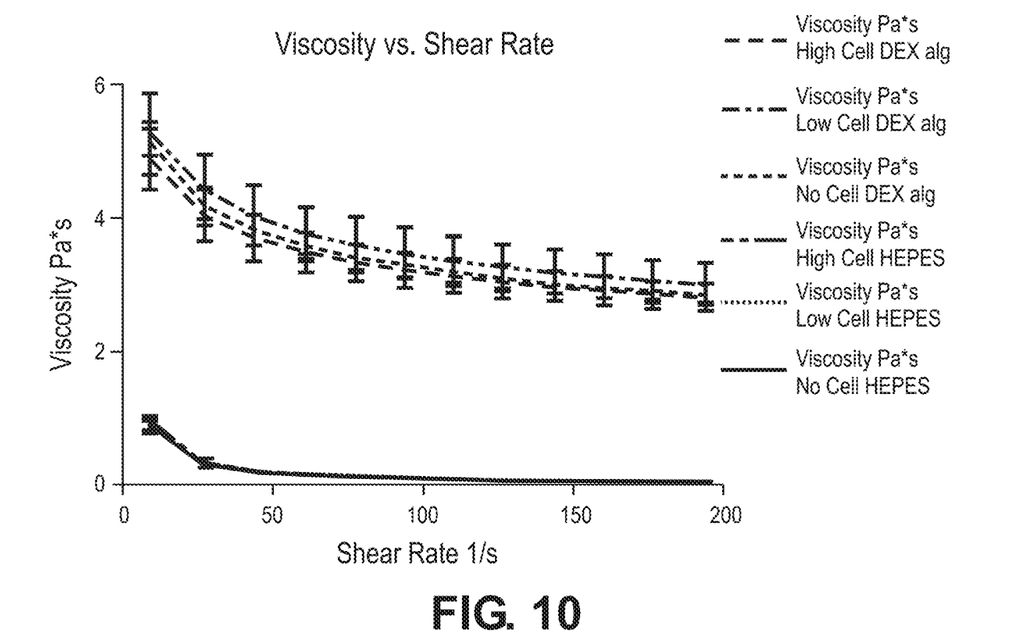
FIG. 10 is a graph showing viscosity vs. shear rate of droplets with no, low, and high cell numbers in both DEX and HEPES.
Figure 11:
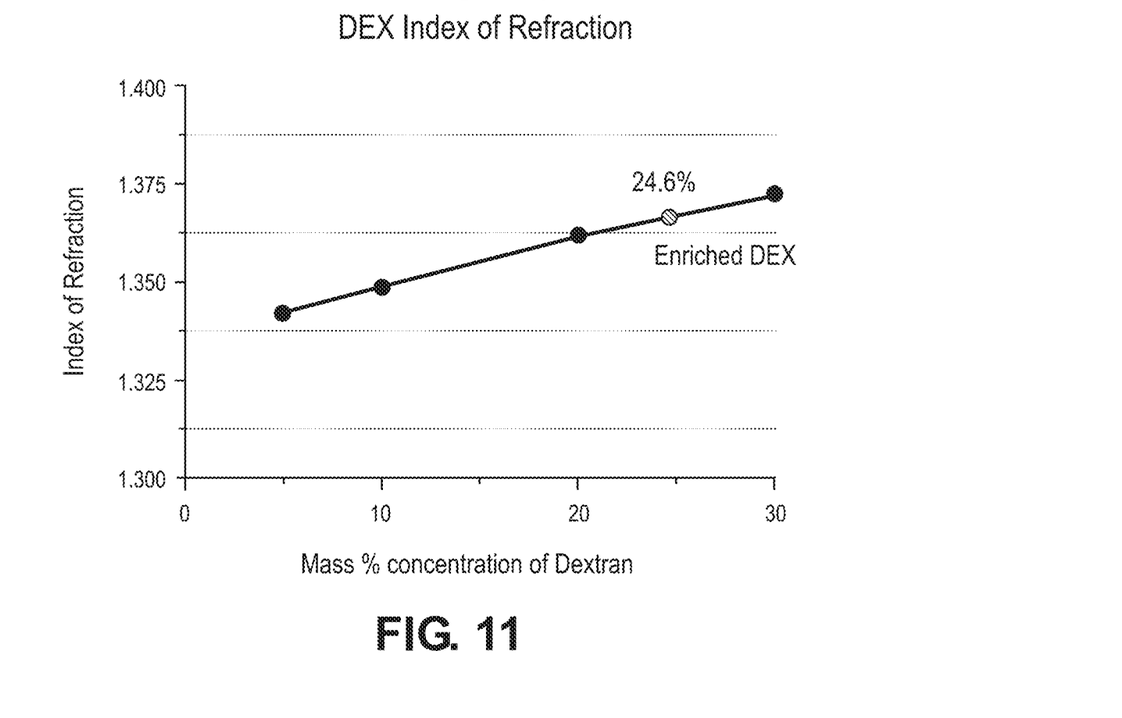
FIG. 11 is a graph showing the DEX Index of refraction.
Figure 12:
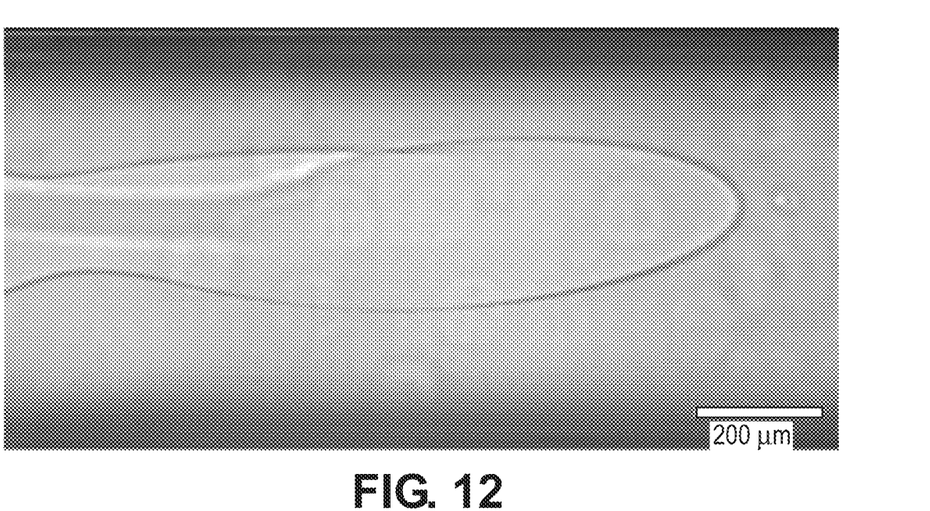
FIG. 12 is an image showing no droplet formation without cells.
Figure 13:
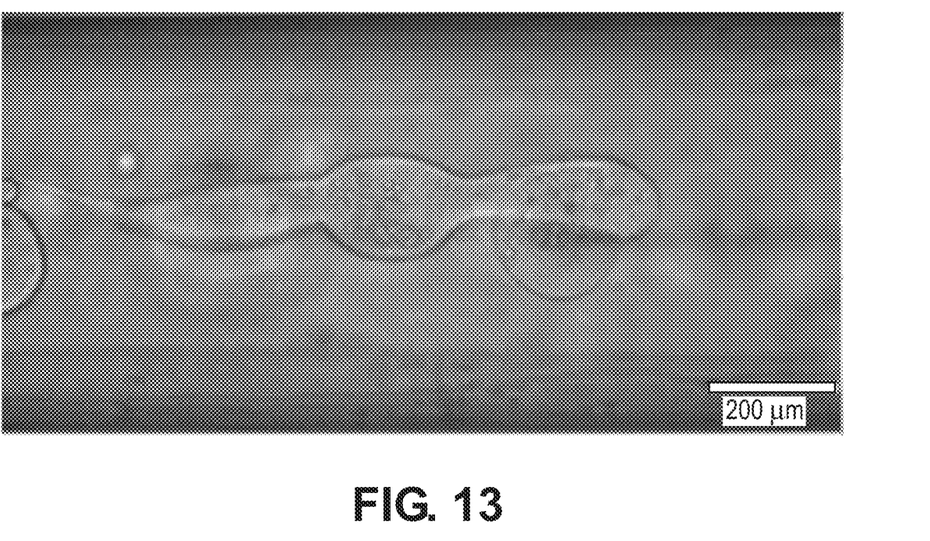
FIG. 13 is an image showing no droplet formation with cells.

Oil-water interfacial tensions are on the order of tens of millinewtons/meter (mN/m), meaning stable phase separation is favorable.[15,16] In contrast, the DEX and PEG aqueous solutions exhibit a very low interfacial tension on the order of hundreds of micronewtons/meter (μN/m)9, requiring higher input energy to favor separation in microfluidic systems. We found that a secondary force supplied by an amplified signal from a speaker facilitates the breakup of two solutions into droplets. By coupling the fluidic inlet of the inner phase (composed of 25% w/w 550 kDa Dextran, 0.5% w/w sodium alginate and a range of concentrations of EMT6 mouse mammary carcinoma model cells) with a direct attachment to a speaker, an acoustic oscillation force enables droplet breakup of a co-flowing fluidic jet. Controlling the input frequency and inner phase flow rates manipulates the size of the hydrogel droplets across a range of 60 to 120 μm diameter for drops without cells (FIG. 2).

As described in greater detail below, the effect of droplet size variation by frequency modulation is observed when enriched PEG (outer phase) is co-flowed with enriched DEX (droplet phase) and monodispersed DEX drops are formed.

According to another embodiment of the present disclosure, this methodology is used to generate monodispersed hydrogels for cell culturing by incorporating a crosslinkable matrix or other gelling substance into at least one of the aqueous phases. According to a specific embodiment, alginate may be used as the crosslinkable matrix. Varying the weight percent concentrations of alginate drastically changes the viscosity of the already highly viscous DEX droplet phase. Specifically, high concentrations of alginate can inhibit the breakup of the inner phase even with incorporation of an amplified signal to the speaker. To overcome this, it was found that reducing the amount of alginate to 0.5% in the DEX droplet phase enabled droplet generation after increasing the amplitude of the applied acoustic force generated from the speaker. A matrix of ideal frequencies, controlled by an Agilent Technologies 33250A Function/Arbitrary Waveform Generator, across varying droplet phase flow rates can be seen in FIGS. 2-13. In general, a decrease in droplet size with increasing acoustic frequency and decreased flow rates was observed.

As stated above, flowing droplets are collected in a suitable media within a reservoir. According to a specific embodiment, the flowing droplets are collected into a $CaCl_2$ bath, which allows for rapid crosslinking of the DEX-alginate gels, resulting in hydrogels with an almost perfect aspect ratio.

According to a still further embodiment, the presently described methodology is used for 3D cell culturing. Specifically, a single cell suspension of a desired cell line in is incorporated into the DEX-alginate aqueous phase prior to droplet formation.

A well-known challenge with the interface of microfluidic droplet generation and cell culture is the necessity for low volumetric flow rates, where cells in a biomaterial suspension may be out of ideal culture conditions for up to hours at a time. As demonstrated by experiments described in greater detail below, the presently described methodology resulted in no quantitative statistically significant difference between a live control group and the experimental (cells in DEX-alginate) group for necrosis. There was a qualitative increase in the necrosis of the cells in the DEX-alginate. However, this is likely due to rigorous dilution, washing, and centrifugation protocol necessary to recover the cell population from the DEX-alginate pre-gel and not due to exposure to the biomaterial nor the time for device operation. Furthermore, the viability of these microgels proved exceptional after 9 days of suspension culture in spinner flask bioreactors. Qualitatively, it appears that there is a lag phase in the proliferation rate of the cells from initial encapsulation to day 3 which is likely caused by a low cell encapsulation concentration (~10 cells/droplet) and the cells being isolated from one another. Once cell-cell contact is established, the growth rate appears to become more exponential and cellular aggregation as in tumor spheroid formation is observed.

Acoustically assisting water/water droplet generation for 3D cell culturing hydrogels provides a low cost and reproducible method to grow and study cell systems across multiple applications. This technology provides a robust method to generate 3D hydrogels for cell culture and has the potential to be used alongside drug discovery platforms or for 3D printing applications. Our initial work proves to be a platform with feasibility for scaling up by incorporating higher volume microfluidics with an acoustic actuator to yield larger, uniform populations of 3D cell encapsulating hydrogels. This method of encapsulating biological components can be used to trap Giant Unilamellar Vesicles (GUVs) which have a notoriously short lifespan in vitro. Finally, using this gentle method to encapsulate biological components may prove to aid in study for future cancer therapeutics or other drug discoveries since the alginate matrix provides a more biomimetic 3D matrix for cell growth.

According to a still further embodiment, the present disclosure provides a method of 3D bioprinting. Specifically, the aqueous two phase microspheres of the present disclosure can be used to shield cells from shear forces produced during the printing process.

3D printing has emerged as an ideal solution for tissue engineering and simulated environments for disease study and could allow design of multicellular architectures. A key technical hurdle preventing the widespread use of cell-based additive patterning is the lack of cell-compatible "bio-inks" that have the required properties for scalable 3D printing.[20] Additionally, printing is hindered by low cell viability of approximately 40-80%,[21] attributed to high shear force on the cells as they are extruded through the printer nozzle.

Figure 14:
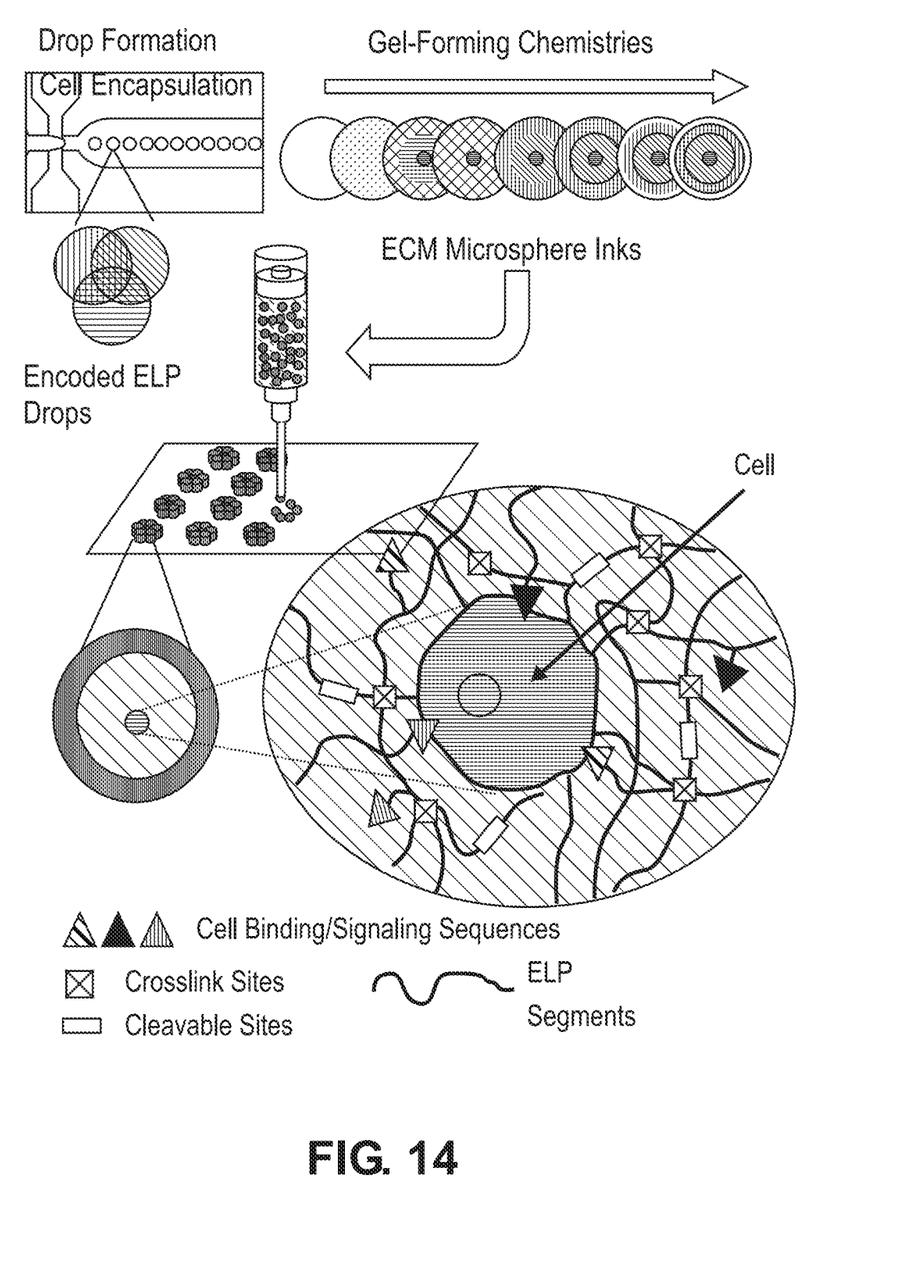
FIG. 14 is a schematic illustration of 3-D bioprinting applications using the methods and/or apparatus of the present disclosure.

Accordingly, the aqueous two phase system derived microspheres with encapsulated cells described herein could serve as 'toner' that can be dispersed within a secondary continuous hydrogel liquid for controlled spatial deposition of a cell-containing "bio-ink" via extrusion printing. (See FIG. 14) The secondary continuous liquid can include crosslinkable biological or synthetic materials used in previous cell printing studies to enable consolidation by cross-linking of the printed liquid microfeatures. Moreover, polypeptides or other additives can be included in the phase separated gel droplet and confer specific function through bioactive domains within the material matrix to direct cell outcome and behavior.

Exemplary Materials and Methods

The description below provides a specific example of specific embodiments of the presently described invention. However, the examples below should not be considered as being limiting as to the scope of the invention as a whole.

Device setup, construction and coupling with loud speaker. For the construction of our microfluidic glass microcapillary device, we use a Sutter Instrument co. P-97 micropipette puller to make our 100 µm injection tip and 200 µm collection tip. The diameters are filed with fine sand paper to exact measurements. The diameter of the unpulled regions of the World Precision Instruments borosilicate glass capillaries is 1.0 mm OD. The injection and collection capillaries are housed in a 1.5 mm OD Harvard borosilicate glass square capillary tube. The ends of the square capillary are covered with Probe Needles M919 plastic-steel syringe tips normal to the surface of the horizontal orientation of the glass capillaries. A square pattern is cut on either side of the syringe tips to snugly cover the capillary components of the device. The syringe tips are then covered and glued down with Deycon Epoxy to prevent leaking over a plain 25×75×1 mm cm Swiss glass slide. The capillaries are aligned using a Zeiss Axio brightfield microscope at 10× magnification. The capillary ends and syringe tips are coupled to Scientific Commodities, Inc. LDPE 1.3208 mm OD Micro Medical Tubing.

The microfluidic device is placed on the microscope stage for droplet synthesis. The injection tubing, coupled to the injection capillary for inner phase infusion, is taped directly to a bare household loudspeaker surface. The loudspeaker is connected to a Fosi Audio 50 W 4 ohms, 20 Hz-20 kHz, 0.04% THD) Stereo Audio Amplifier Mini Hi-Fi Professional Amp for Home Speakers approximately 10 cm from the microfluidic device. The frequency input signal's source is an Agilent Technologies 33250A Function/Arbitrary Waveform Generator connected directly into the amplifier. The input peak-to-peak voltage is set to 10 V for all of the experiments. We vary the frequency in 5 Hz intervals from 10 Hz to 60 Hz to generate the matrices seen in FIGS. 2-13. The injection tubing is connected to a Becton Dickson 10 mL plastic syringe and Harvard Apparatus, PHD 200 Infuse/Withdraw, CAT #: 70-2001, FREQ(HZ) 50/60 Syringe Pump approximately 74 cm from the microfluidic device. The injection syringe contains the ~$10^7$ cells/mL of EMT6 mouse mammary carcinoma cells in 5% enriched 550 kDa Dextran 25 mM 4-(2-hydroxyethyl)-1-piperazineethane-sulfonic acid (HEPES), 150 mM NaCl aqueous solution from Sigma Aldrich with 0.5% by weight alginate from Sigma Aldrich at pH7.4. The tubing connected to the outer phase infusion syringe tip is connected to a Becton Dickson 60 mL plastic syringe on another Harvard Apparatus Syringe Pump approximately 80 cm from the microfluidic device. The 60 mL syringe contains the outer phase solution of 17% enriched 8 kDa Poly(ethylene glycol) 25 mM HEPES, 150 mM NaCl aqueous solution at pH 7.4 from Sigma Aldrich. The second syringe tip distal to the injection side is coupled with the same Micro Medical Tubing and connected to a Becton Dickson 10 mL plastic syringe for excess outer phase waste approximately 20 cm from the device. The collection capillary is connected with a short 2.38 mm OD Tygon tubing to another 1.0 mm OD ~90° bent World Precision Instruments borosilicate glass capillary that is submerged in a 20 mL Scintillation vial half-filled with a solution of 1M $CaCl_2$, 150 mM NaCl, 25 mM HEPES, and pH 7.4 cross-linking solution.

Aqueous polymer phase separation (polymer phase enrichment). The Dextran (DEX) and Poly(ethylene glycol) (PEG) solutions are "enriched" prior to hydrogel synthesis. 5% w/w of a 50 mL aqueous solution of 550 kDa DEX in 25 mM HEPES buffer, 150 mM NaCl at pH of 7.4 is dissolved thoroughly. A 17% w/w 50 mL aqueous solution of 8 kDa (PEG) 25 mM HEPES buffer, 150 mM NaCl at pH of 7.4 is dissolved as well. The two clear solutions are added to a 125 mL glass separatory funnel and mixed thoroughly. The two aqueous polymer phases are given 48-hours to separate into distinct phases. The higher density DEX phase separates into the bottom of the funnel and the lower density PEG remains as the top phase. A Refractometer was used to verify the bottom phase as DEX. Each phase is then collected into separate vials. 0.5% w/w alginate is added to the collected DEX and stirred for 24 hours for complete mixing. The DEX-alginate and PEG solutions are then both filtered using a 0.2 µm Nalgene bottle top filter to sterilize for cell culture.

Four pure dextran weight percent solutions were mixed in the polymer buffer, used for the cell encapsulation experiments, containing millipore filtered water, 150 mM NaCl, and 25 mM Hepes pH controlled at 7.4. The solutions were prepared at 5% w/w, 10% w/w, 20% w/w, and 30% w/w of DEX in polymer buffer. The solutions were measured for their index of refraction values 5 times each with a standard deviation smaller than the area of the points on the graph. A 17% PEG and 5% DEX in aqueous polymer buffer solution was enriched as described previously; the bottom phase was collected for interrogation. The value of the unknown bottom phase was plotted against the known indexes of refraction and interpolated to the fit quadratic curve to determine the mass %. Based on the total volume the bottom phase, ~20 mL, relative to the total volume of partitioned PEG and DEX, 200 mL, the index of refraction value (red) agrees with the theoretical calculated number; 24.6% to 25% respectively.

Three-dimensional cell culturing. EMT6 mouse mammary carcinoma cells are maintained using standard sterile cell culture conditions (37° C., 5% $CO_2$) in 150 mm tissue culture treated polystyrene dishes (Corning) with 20 mL of Minimal Essential Media supplemented with 10% Fetal Bovine Serum and 1% Penicillin/Streptomycin (Sigma-Aldrich) to grow up for encapsulation. In general, if desired cell/droplet occupancy is 10 cells/100 μm DIA droplet then $2\times10^7$ cells/mL is required for the encapsulation protocol. This concentration is easily adjusted by changing the initial cell encapsulation concentration. Cells at ~80% confluence in 150 mm dishes (depending on the desired final concentration) are washed with 3 mL of 0.5% Trypsin and then incubated in 5 mL of 0.5% Trypsin (Sigma-Aldrich) for up to 30 minutes to digest and release attached cells. The cells are then washed off the dish with gentle pipetting by adding 5 mL of media to the 5 mL of trypsin and cells. This 10 mL cell suspension is transferred into a 50 mL centrifuge tube (and combined with cells recovered from additional 150 mm dishes if applicable), a sample is taken for cell counting using a Z Series Coulter Counter and centrifuged at 1500 RPM for 10 minutes to pellet. The cell concentration to be used is determined, the cell pellet is resuspended into 20 mL physiological buffer (25 mM HEPES, 150 mM NaCl, pH 7.4), and the volume corresponding to the desired final cell concentration is transferred to a fresh 50 mL centrifuge tube. This adjusted cell suspension is then centrifuged at 1500 RPM for 10 mins to wash and pellet. The physiological buffer supernatant is then aspirated and the cell pellet is resuspended into 500 μL of sterile filtered DEX-alginate by gentle pipetting using a 1000 μL pipette. The 500 μL of DEX-alginate cell suspension is drawn up into an 18 G needle/10 mL syringe (BD) and then added dropwise to 2.5 mL of DEX-alginate in a 50 mL centrifuge tube while vortexing. The 3 mL cell suspension is then passed through a 40 μm cell strainer test-tube filter insert (BD Falcon) into a fresh 50 mL centrifuge tube to produce the final single cell suspension in DEX-alginate. A sample is taken from this solution to count the final cell concentration as there is some cell loss during the protocol due to the highly-viscous nature of the DEX-alginate and the filtering out of any cell clumps. This dropwise-vortex mixing and filtering of the DEX-alginate and cells guarantees a single cell suspension which is paramount to avoiding clogs in the microfluidics device. The cell suspension is loaded into a 10 mL syringe for droplet synthesis in the microfluidics system.

Over the course of droplet synthesis (about once/hour), crosslinked droplets are removed from the setup and allowed to settle in the 1 M $CaCl_2$ buffer so that the excess $Ca^{2+}$ may be removed and the cell encapsulating droplets can be transferred by gentle pipetting into a temperature equilibrated 125 mL spinner flask bioreactor (Corning) with 125 mL of complete media adjusted to pH 7.4 with 25 mM HEPES. For the to initial time point, a 20 μL sample of droplets is pipetted onto a microscope slide (VWR) and placed onto a brightfield microscope for imaging using a Nikon camera and SPOT Basic software. Once the total cell encapsulating droplet population has been transferred into the spinner flask bioreactor, the head space is backfilled with 5% $CO_2$ and placed onto a slow stir plate in a warm room maintained at 37° C. for the duration of the time course (9 days). At days 3, 5, 7, and 9 samples are taken from the culture for imaging as described above and the culture media is changed. The spinner flask bioreactor is removed from the stir plate, allowing the droplets to settle to the bottom of the flask. Once settled, the media is aspirated being careful to leave about 20 mL at the bottom so as to not aspirate droplets and then refiled to a final volume of 125 mL with temperature equilibrated complete media and backfilled as before.

On day 9, the total droplet population is collected and the cells are recovered as well as counted for comparison to the initial cell concentration. To collect the droplet population, the droplets are allowed to settle and the media is aspirated until 20 mL of media and droplets remain in the spinner flask. The 20 mL of droplets and media is pipetted into a 50 mL centrifuge tube and the droplets are allowed to settle once more (~10 minutes). The remaining media is carefully aspirated and 20 mL of a droplet dissolving buffer (0.5% trypsin, 50 mM sodium citrate, 25 mM HEPES, 150 mM NaCl pH 7.4) is added to the droplets in the 50 mL tube. The tube is incubated at 37° C. for 30 minutes with vortexing every 5 minutes to encourage dissociation of cell aggregates. The recovered cells in dissolving buffer are then centrifuged at 1500 RPM for 10 minutes, resuspended into 1 mL of physiological buffer and counted using the Coulter Counter.

Flow cytometry analysis. Upon completion of droplet synthesis, we assay the cells from the remaining cell suspension in DEX-alginate for apoptosis by annexin V and necrosis by propidium iodide (also known as LIVE/DEAD). The DEX-alginate cell suspension is compared to LIVE and DEAD control populations. The LIVE cells are processed with trypsinization into a single cell suspension and remain in complete media on ice during the experiment while the DEAD control cells are treated by suspension in 50% ethanol for 60 minutes at 37° C. and 5% $CO_2$ in the incubator. Once the DEX-alginate cell suspension has been in ambient conditions for the duration of droplet generation (~2 hours), it is transferred to a 15 mL centrifuge tube and diluted by the addition of physiological buffer to dilute the viscosity of the solution. The suspension is centrifuged at 3000 RPM for 10 minutes. In this first wash, the cells form a band towards the bottom of the test tube but have not yet been fully pelleted so ~5 mL of the diluted DEX-alginate is removed by aspiration and 5 mL of physiological buffer is added and vortexed. The tube is centrifuged at 3000 RPM for 10 minutes. This wash/centrifugation protocol is repeated once more to pellet the cells at the bottom of the tube and remove as much residual DEX-alginate solution as possible. The DEX-alginate-buffer supernatant is aspirated and the cells are washed in 10 mL of physiological buffer followed by aliquoting into 4, 15 mL test tubes and centrifugation at 2000 RPM for 10 minutes. The staining protocol is then followed as described in Alexa Fluor 488® annexin V/Dead cell apoptosis Kit with Alexa Fluor 488® annexin V and PI for flow cytometry from Invitrogen. The samples are analyzed (100,000 events per group) using an Attune NxT flow cytometer.

Rheology. A Discovery Hybrid Rheometer HR-3 with the 40 mm 2.0 cone plate, peltier plate steel geometry has been used to do the rheology analysis. Each sample was loaded two times on the rheometer and the experiment was repeated for three times for each load. The rheological characteristic of the samples has been analyzed with two different methods. The first one is the frequency sweep with the angular frequency from 628 to 0.1 rad/s and the second one is the flow ramp with shear rate from 0.01 to 1000 l/s. The young and storage modulus and complex viscosity can be obtained from the frequency sweep test and the viscosity can be obtained from the flow ramp test (used for FIG. 2). Each measurement has been repeated three times for consistency.

The results obtained for the following solutions of PEG and DEX are listed below. We chose these solutions to observe whether cell concentration affects viscosity which therefore affects the droplet generation capabilities of our microfluidic device.
1. DEX+PBS (no, low, and high cell)
2. ALG+PBS (no, low, and high cell)
3. DEX+PBS (no, low, and high cell)
4. ALG (no, low, and high cell)
5. DEX (no, low, and high cell)

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims.

References: All patents and publications referenced or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

(1) Andersen, T.; Auk-Emblem, P.; Dornish, M. 3D Cell Culture in Alginate Hydrogels. Microarrays 2015, 4 (2), 133-161.
(2) Tabriz, A. G.; Hermida, M. A.; Leslie, N. R.; Shu, W. Three-Dimensional Bioprinting of Complex Cell Laden Alginate Hydrogel Structures. Biofabrication 2015, 7 (4).
(3) He, Y.; Yang, F.; Zhao, H.; Gao, Q.; Xia, B.; Fu, J. Research on the Printability of Hydrogels in 3D Bioprinting. Sci. Rep. 2016, 6.
(4) Knight, E.; Przyborski, S. Advances in 3D Cell Culture Technologies Enabling Tissue-like Structures to Be Created in Vitro. Journal of Anatomy. 2015, pp 746-756.
(5) Workman, V. L.; Dunnett, S. B.; Kille, P.; Palmer, D. Microfluidic Chip-Based Synthesis of Alginate Microspheres for Encapsulation of Immortalized Human Cells. Biomicrofluidics 2007, 1 (1).
(6) Cristini, V.; Tan, Y.-C. Theory and Numerical Simulation of Droplet Dynamics in Complex Flows—a Review. Lab Chip 2004, 4 (4), 257-264.
(7) Tan, Y. C.; Cristini, V.; Lee, A. P. Monodispersed Microfluidic Droplet Generation by Shear Focusing Microfluidic Device. Sensors Actuators, B Chem. 2006, 114 (1), 350-356.
(8) Baroud, C. N.; Gallaire, F.; Dangla, R. Dynamics of Microfluidic Droplets. Lab Chip 2010, 10 (16), 2032.
(9) Ziemecka, I.; van Steijn, V.; Koper, G. J. M.; Rosso, M.; Brizard, A. M.; van Esch, J. H.; Kreutzer, M. T. Monodisperse Hydrogel Microspheres by Forced Droplet Formation in Aqueous Two-Phase Systems. Lab Chip 2011, 11 (4), 620-624.
(10) Iqbal, M.; Tao, Y.; Xie, S.; Zhu, Y.; Chen, D.; Wang, X.; Huang, L.; Peng, D.; Sattar, A.; Shabbir, M. A. B.; et al. Aqueous Two-Phase System (ATPS): An Overview and Advances in Its Applications. Biological Procedures Online. 2016, pp 1-18.
(11) Hatti-kaul, R. Aqueous Two-Phase Systems. Mol. Biotechnol. 2001, 19 (3), 697-713.
(12) Albertsson, P.-Å. Aqueous Biphasic Systems. Properties and Applications in Bioseparation. In Aqueous Biphasic Separations: Biomolecules to Metal Ions; 1995; pp 21-30.
(13) MacE, C. R.; Akbulut, O.; Kumar, A. A.; Shapiro, N. D.; Derda, R.; Patton, M. R.; Whitesides, G. M. Aqueous Multiphase Systems of Polymers and Surfactants Provide Self-Assembling Step-Gradients in Density. J. Am. Chem. Soc. 2012, 134 (22), 9094-9097.
(14) Song, Y.; Shum, H. C. Monodisperse w/w/w Double Emulsion Induced by Phase Separation. Langmuir 2012, 28 (33), 12054-12059.
(15) Jian, C.; Poopari, M. R.; Liu, Q.; Zerpa, N.; Zeng, H.; Tang, T. Reduction of Water/Oil Interfacial Tension by Model Asphaltenes: The Governing Role of Surface Concentration. J. Phys. Chem. B 2016, 120 (25), 5646-5654.
(16) Peters, F.; Arabali, D. Interfacial Tension between Oil and Water Measured with a Modified Contour Method. Colloids Surfaces A Physicochem. Eng. Asp. 2013, 426, 1-5.
(17) Eggers, J.; Villermaux, E. Physics of Liquid Jets. Reports Prog. Phys. 2008, 71 (3).
(18) Freyer, J. P.; Sutherland, R. M. Proliferative and Clonogenic Heterogeneity of Cells from EMT6/Ro Multicellular Spheroids Induced by the Glucose and Oxygen Supply. Cancer Res. 1986, 46 (7), 3513-3520.
(19) Kelm, J. M.; Timmins, N. E.; Brown, C. J.; Fussenegger, M.; Nielsen, L. K. Method for Generation of Homogeneous Multicellular Tumor Spheroids Applicable to a Wide Variety of Cell Types. Biotechnol. Bioeng. 2003, 83 (2), 173-180.
(20) Murphy, S. V. and A. Atala, *3D bioprinting of tissues and organs*. Nat Biotech, 2014. 32(8): p. 773-785.
(21) Chang, R., J. Nam, and W. Sun, *Effects of Dispensing Pressure and Nozzle Diameter on Cell Survival from Solid Freeform Fabrication-Based Direct Cell Writing*. Tissue Engineering Part A, 2008. 14(1): p. 41-48.
(22) Phillippi, J. A., E. Miller, L. Weiss, J. Huard, A. Waggoner, and P. Campbell, *Microenvironments Engineered by Inkjet Bioprinting Spatially Direct Adult Stem Cells Toward Muscle- and Bone-Like Subpopulations*. STEM CELLS, 2008. 26(1): p. 127-134.
(23) Mironov, V., R. P. Visconti, V. Kasyanov, G. Forgacs, C. J. Drake, and R. R. Markwald, *Organ printing: Tissue spheroids as building blocks*. Biomaterials, 2009. 30(12): p. 2164-2174.

(24) Kim, J. D., J. S. Choi, B. S. Kim, Y. Chan Choi, and Y. W. Cho, *Piezoelectric inkjet printing of polymers: Stem cell patterning on polymer substrates.* Polymer, 2010. 51(10): p. 2147-2154.

What is claimed is:

1. A method comprising:
   providing first and second aqueous phase solutions, the first aqueous phase solution comprising a cross-linkable matrix;
   delivering an acoustic force to the first aqueous phase solution from an acoustic wave generator upstream of a microfluidic device while flowing the first aqueous phase solution to the microfluidic device to form droplets of the first aqueous phase solution in the microfluidic device;
   flowing the second aqueous phase to the microfluidic device to combine with the droplets of the first aqueous phase solution to form monodispersed phase separated aqueous droplets; and
   collecting the droplets in a crosslinking solution to crosslink the cross-linkable matrix, to form a population of monodisperse hydrogel particles.

2. The method of claim 1 wherein the first aqueous phase solution includes a viable cell suspension, wherein the population of monodisperse hydrogel particles comprise encapsulated viable cells from the cell suspension.

3. The method of claim 1 wherein the first aqueous phase solution further comprises an additive.

4. The method of claim 1 wherein the first aqueous phase solution comprises dextran (DEX).

5. The method of claim 1 wherein the second aqueous phase solution comprises polyethylene glycol (PEG).

6. The method of claim 1 wherein the first aqueous phase solution comprises DEX and the second aqueous phase solution comprises PEG.

7. The method of claim 1 wherein the first aqueous phase solution further comprises alginate.

8. The method of claim 2, further comprising:
   providing a bioink comprising the population of monodisperse hydrogel particles comprising the encapsulated viable cells; and
   extruding the bioink into a three-dimensional shape through a printer nozzle.

9. The method of claim 8, wherein the bioink further comprises a secondary continuous liquid.

10. The method of claim 9, wherein the secondary continuous liquid comprises a crosslinkable biological or synthetic material.

11. The method of claim 8, wherein the encapsulated cells in the extruded three-dimensional shape are viable cells.

12. The method of claim 3, wherein the additive comprises a polypeptide.

13. The method of claim 1, wherein the crosslinking solution comprises $CaCl_2$.

14. The method of claim 1, wherein the crosslinking solution comprises 4-(2-hydroxyethyl)-1-piperazineethanesulfonic acid (HEPES).

15. The method of claim 1, wherein the first and/or second aqueous phase solution comprises a drug, a complex sugar, a nucleic acid, a protein, or an amino acid.

16. The method of claim 2, wherein the viable cells comprise mouse mammary carcinoma cells or giant unilamellar vesicles (GUVs).

17. The method of claim 2, wherein the viable cells comprise EMT6 mouse mammary carcinoma cells.

18. The method of claim 1, wherein the first and/or second aqueous phase solution further comprises a buffer, NaCl, or a combination thereof.

19. The method of claim 1, wherein the first and/or second aqueous phase solution comprises 4-(2-hydroxyethyl)-1-piperazineethanesulfonic acid (HEPES).

20. The method of claim 1, wherein the acoustic wave generator is a speaker.

21. The method of claim 1, wherein the acoustic wave generator is free of direct contact with the first aqueous phase solution.

* * * * *